United States Patent [19]

Bullard

[11] 3,740,521
[45] June 19, 1973

[54] SOLDERING APPARATUS FOR SAW CUTTING TEETH

[76] Inventor: Martin Blythe Bullard, 7111 Pomelo Drive, Canoga Park, Calif. 91304

[22] Filed: Aug. 16, 1971

[21] Appl. No.: 171,886

[52] U.S. Cl.................. 219/85, 143/135 R, 219/86, 219/91
[51] Int. Cl................................................ B23k 1/04
[58] Field of Search................... 219/85, 86, 87, 91, 219/78; 143/135 R; 228/44

[56] References Cited
UNITED STATES PATENTS

| 3,340,378 | 9/1967 | Miller | 219/85 |
|---|---|---|---|
| 3,384,283 | 5/1968 | Mims | 219/85 UX |
| 3,617,682 | 11/1971 | Hall | 219/85 |
| 3,353,263 | 11/1967 | Helms | 219/85 X |
| 3,099,738 | 7/1963 | Saelowski | 219/85 |
| 3,467,155 | 9/1969 | Pfetter et al. | 143/135 R |

*Primary Examiner*—J. V. Truhe
*Assistant Examiner*—L. A. Schutzman
*Attorney*—Pastoriza & Kelly

[57] ABSTRACT

A mounting block has a retaining opening for receiving and holding a metal carrier supporting a carbide bit with necessary layers of silver solder and flux between the metal carrier and carbide bit. A pair of swing arms have jaws that engage opposing sides of the carbide bit to properly orient it on the metal carrier.

A pair of movable electrodes is selectively urged by a force applying means to bear against an electrical conductor and cause it to bear against the carbide bit with a predetermined and controlled amount of force.

With the metal carrier and carbide bit thus oriented and the metal carrier securely clamped against the mounting block, an electrical power supply circuit can be energized to solder the metal carrier and carbide bit together. Current flows through one electrode into the electrical conductor and outwardly through the other electrode without passing through either the carbide bit or the metal carrier. The duration is relatively short so that heat generated by the current passing through the joint does not penetrate very deeply into the metal carrier. A joint is thus produced with a controlled joint thickness and controlled distribution of the silver solder, a portion of which constitutes a fillet under and around the carbide bit to assist in stabilizing the joint.

21 Claims, 4 Drawing Figures

Patented June 19, 1973

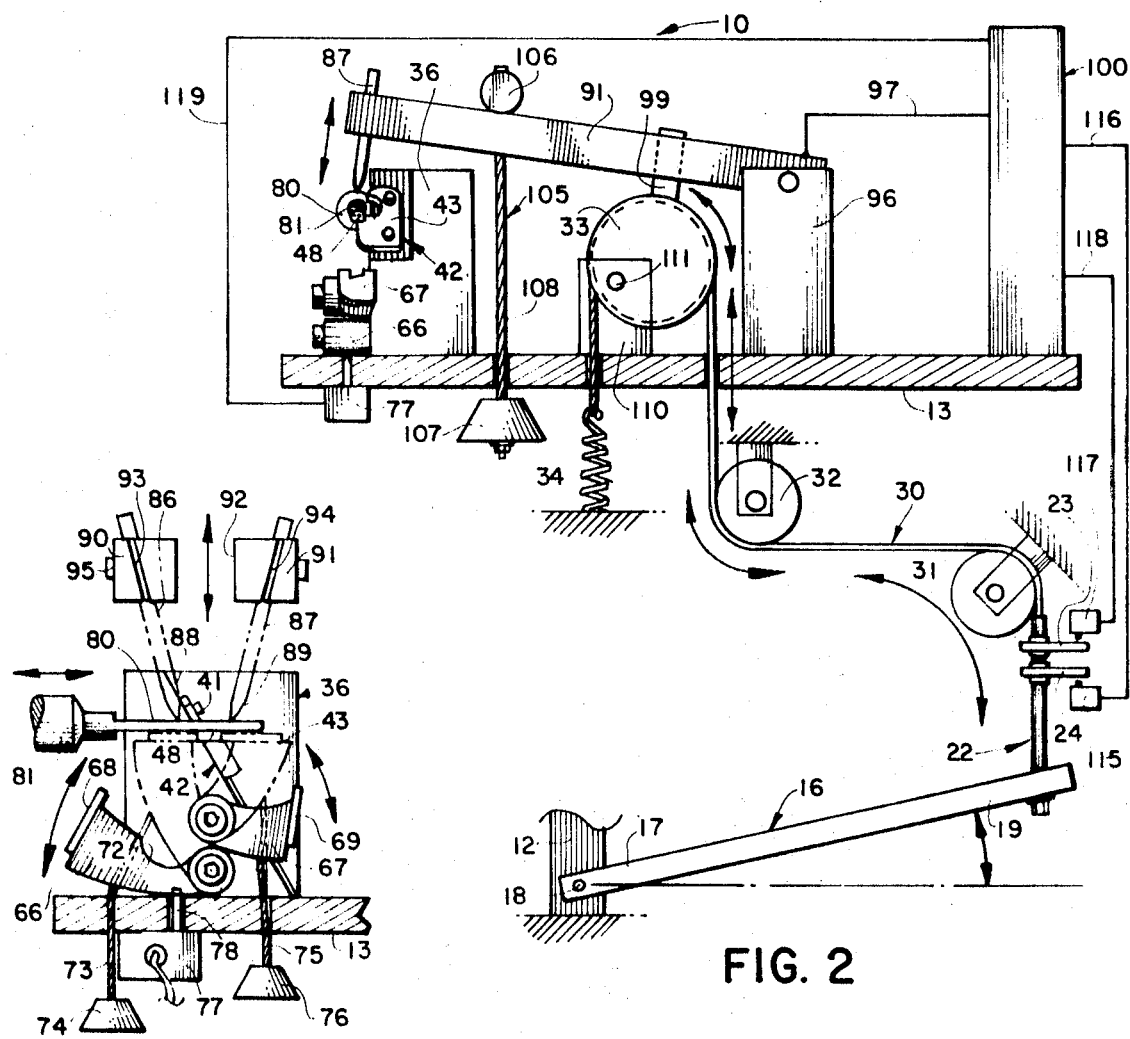
FIG. 2
FIG. 4
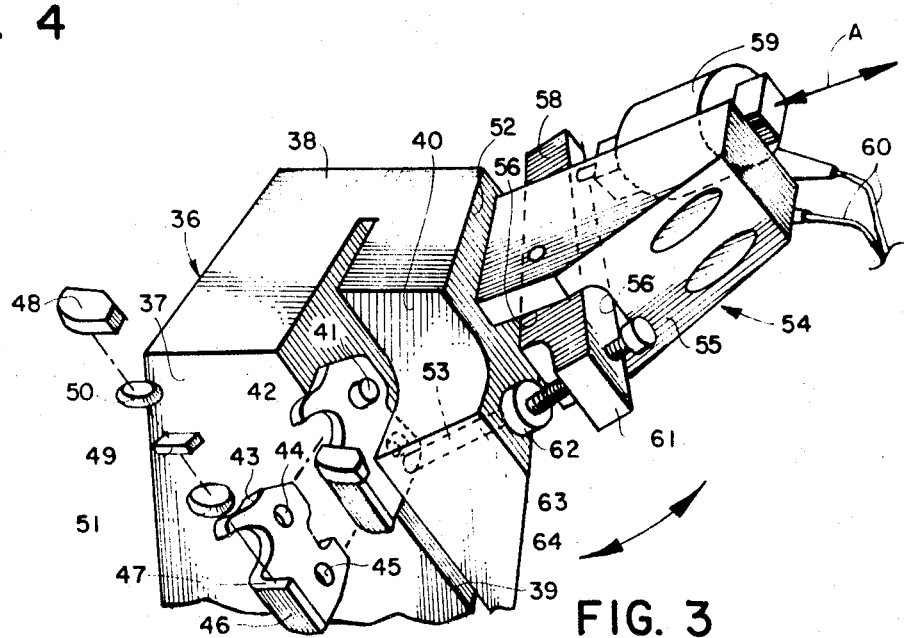
FIG. 3

“3,740,521”

SOLDERING APPARATUS FOR SAW CUTTING TEETH

BACKGROUND OF THE INVENTION

This invention generally relates to equipment for joining together dissimilar types of metal and more specifically to a machine for simultaneously producing heat and pressure in order to solder a carbide bit to a heat treated metal carrier that may ultimately be used as a cutting tooth for a power chain saw.

Cutting teeth incorporated in conventional power chain saws tend to become worn and dull after a relatively short period of use which requires frequent resharpening and replacement.

An approach aimed at overcoming these disadvantages is disclosed in U.S. Pat. No. 3,292,675 to Bullard entitled CUTTER ELEMENTS FOR CHAIN SAWS wherein tooth cutting tips are constructed from extremely hard material such as carbide, boron hydride, diamond or the like.

It is difficult to securely and permanently fix carbide cutting tips on teeth by way of conventional techniques such as welding, brazing and silver soldering. Heat generated during procedures involving these conventional techniques is absorbed by the metal carrier in such large quantities that the metal carrier becomes inherently embrittled and/or annealed so that the joint is thereafter prone to breakage upon severe impact and fatigue during cutting operations.

If sufficient heat and pressure are not applied to the joint during the assemblage operation then the carbide bit will be imperfect resulting from an intermediate layer of silver solder being too thin or too thick and possibly incorporating gas bubbles.

The optimum thickness of silver solder in a joint of this type is 0.0005 inches which will have a strength of approximately 50,000 psi. If the layer of silver solder in the joint is greater or less than this optimum thickness strength will be sacrificed. If the layer of silver solder includes gas bubbles generated during the soldering operation then joint strength will likewise be sacrificed.

Conventional mechanisms for attempting to securely hold a carbide bit in place on a metal carrier and simultaneously apply heat to the joint cannot effectively isolate the joint and concentrate the heat only at the joint and its immediate vicinity. Induction coil machines, for example, require the induction coil to virtually surround the joint as heat is applied and this of course tends to destroy the strength of the heat treated metal carrier. It is customary in some silver soldering machines to pass electrical current directly through the package or layers of materials intended to constitute the joint and this operates to engender bubbles within the silver solder and seriously impair the joint.

BRIEF DESCRIPTION OF THE DRAWINGS

The numerous benefits and unique aspects of the present invention will be fully understood when the following detailed description is studied in conjunction with the drawings in which:

FIG. 2 is a side elevational, partly sectional schematic view showing portions of an electric power supply circuit and mechanical interrelationships of some of the components;

FIG. 3 is a perspective view of a metal carrier and carbide bit situated in the retaining opening of the mounting block with the clamping means prepared to clamp the metal carrier in place; and, FIG. 4 is a front elevational view showing how the pair of arms with orienting jaws can arrange the carbide tip on the metal carrier, and how the electrodes can be urged downwardly against the electrical conductor to exert force on the carbide bit.

SUMMARY OF THE INVENTION

Figure 1:
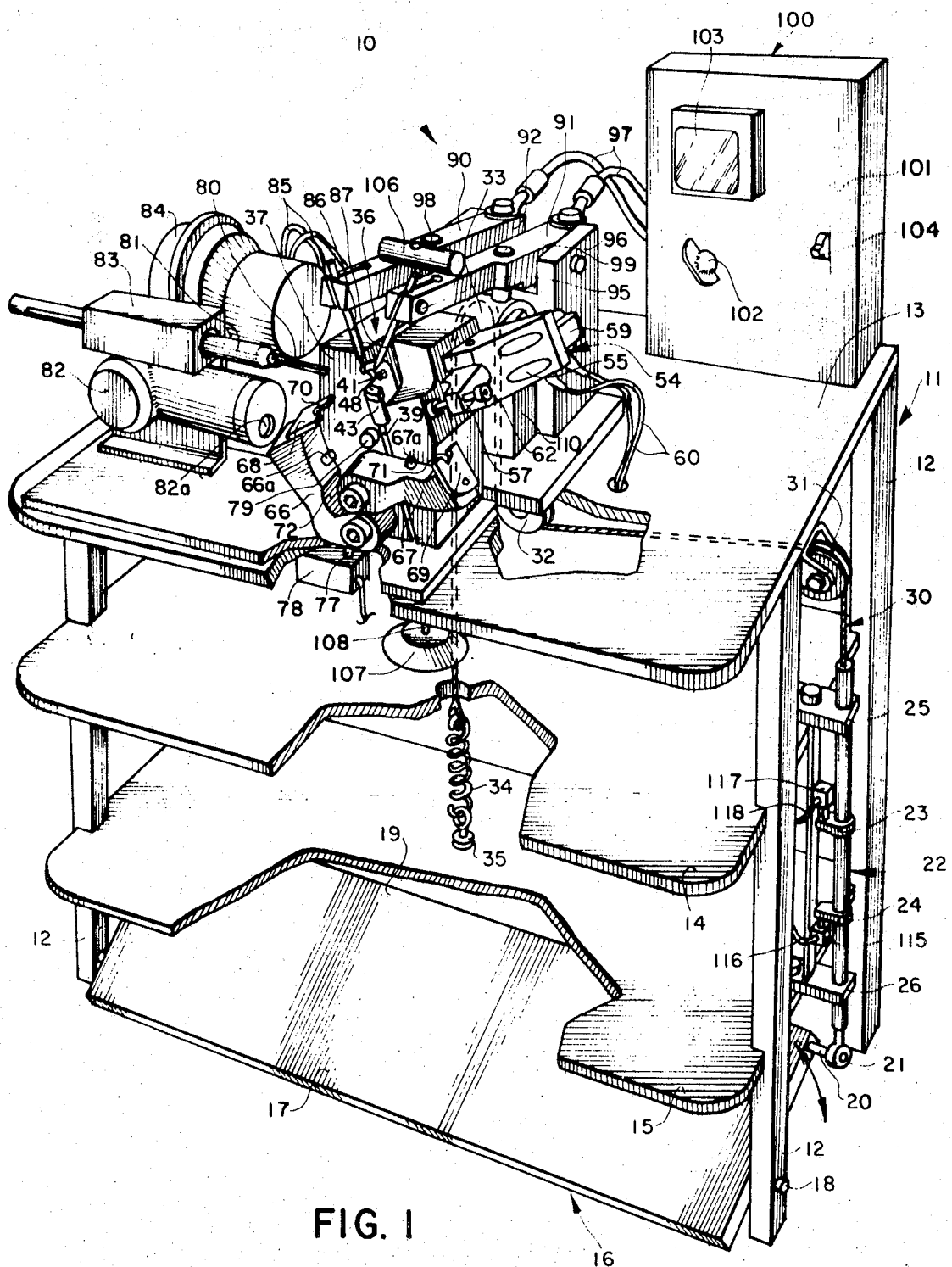
FIG. 1 is a perspective partly sectional view showing a soldering apparatus for saw cutting teeth constructed in accordance with this invention.

Briefly stated this invention comprehends a soldering machine for joining together a metal carrier and carbide bit.

The machine incorporates a mounting block with a retaining opening shaped to receive and retain a metal carrier. Orienting means functions to properly orient a carbide bit on the metal carrier and clamping means operates to releasably clamp the metal carrier within the retaining opening. A pair of electrodes retained by holding means is connected to an electrical power supply circuit that can be selectively operated to energize the electrodes.

Force applying means is operated to cause pressure on an electrical conductor disposed on the carbide bit simultaneously as the electrical power supply circuit transmits current to the electrodes during the soldering operation. The carbide bit becomes soldered to the metal carrier when the electrical power supply circuit causes current to flow in a path from one electrode through the electrical conductor and outwardly through the other electrode.

The orienting means is constituted by a pair of arms with orienting jaws arranged to move from retracted positions towards one another and the retaining opening so the jaws may engage opposing sections of the carbide bit and set it at a predetermined position on the carrier.

The orienting jaws have notches of complementary shape relative to their corresponding opposing sections of the carbide bit.

The electrical conductor is secured to a shuttle movable to shift the electrical conductor between an extended position adjacent the electrodes and a retracted position away from the electrodes. The electrical conductor is preferably fabricated from substantially pure carbon and has an elongated flat surface that can be arranged to face downwardly and make flush engagement with the carbide bit.

The holding means is constituted by a pair of spaced holding beams that define an intermediate slot and are pivotally coupled to a stand. The force applying means is coupled to the holding beams to transmit force to the electrodes which are caused to bear upon the carbide bit. The force applying means has a cross bar spanning the slot between the holding beams, an adjustable weight, and a cable connecting the weight and cross bar to suspend the weight beneath the slot.

The mounting block has a slide way extending between the retaining opening and an external location. The clamping means includes a plunger positioned partially within the slide way and movable between an extended limit in engagement with the metal carrier and a retracted limit disengaged from the metal carrier.

DETAILED DESCRIPTION OF THE PREFERRED EMBODIMENT

Referring to FIG. 1 a soldering apparatus 10 is shown constructed for soldering carbide bits to metal carriers to thereby produce cutting teeth for power chain saws. A work table 11 for accommodating a sole operator has a plurality of vertical support columns 12 arranged to constitute a rigid open framework together with an upper shelf 13, an intermediate shelf 14 and a lower shelf 15. Situated beneath lower shelf 15 is a foot treadle 16 that a person may use to perform certain important operations. The lower inclined portion 17 of foot treadle 16 is pivoted at its opposite ends to a pair of columns 12 by pivot pins 18 and the upper inclined portion 19 is secured to a horizontal rod 20, one end of which is journalled within the depending eyelte 21 of an upright switch operating rod 22.

Referring to FIG. 1 and FIG. 2, which schematically depicts portions of soldering apparatus 10, switch operating rod 22 carries an upper stop 23 and a lower stop 24. When foot treadle 16 is depressed or released vertical movement or rod 22 is guided by openings in an upper guide block 25 fixed to shelf 14 and a lower guide block 26 fixed to lower shelf 15. The guide openings are sized to provide enough clearance so that rod 22 will not become jammed while being moved upwardly or downwardly.

The upper end end of switch operating rod 22 is fixed to a cable 30 which is guided over an idler pulley 31 secured to shelf 13 and trained around another idler pulley 32 secured directly or indirectly to shelf 13. Cable 30 is wound over an eccentrically mounted barrel cam 33 whose function shall be subsequently fully described, and eventually is coupled to a sprin 34 fixed by an anchoring element 35 secured to shelf 15. Alternatively, the spring 34, or other resilient element could be secured to the lower end of switch operating rod 22.

Referring now to FIG. 1 and primarily FIG. 3 a mounting block 36 fixed to upper shelf 13 has a front section 37, a rear section 38 and a retaining opening 39 constituted by a diagonally oriented or slanted slot extending from front section 37 either partially or entirely through rear section 38. A portion of front section 37 is removed or shaped to constitute a side notch 40 and a hanging peg 41 projects from the wall of retaining opening 39 which extends generally beneath the mating wall.

For purposes of illustration a cutting tooth 42 for a power chain saw is shown situated within retaining opening 39 whicle being loosely hung on hanging peg 41. To better explain the particular details of cutting tooth 42 it is also shown exploded outwardly from retaining opening 39 with some of its components depicted in a stack. Cutting tooth 42, somewhat like that disclosed in U.S. Pat. No. 3,292,675 to M. B. Bullard, has a metal carrier 43 with forward and rearward linkage retaining apertures 44 and 45 shaped to receive pintles to join metal carrier 43 to either links or drive lugs in a well known manner. Bent out of the plane of the main body of metal carrier 43 is a transverse plate 46 terminating at its forward tip in a bearing shoulder 47 specially shaped to receive and tightly mount a carbide bit 48. The purpose of soldering apparatus 10 is to effectively bond carbide bit 48 to metal carrier 43 so that cutting durability will be enhanced. It is known to accomplish this by way of an intermediate silver solder billet. A mass of flux 50 is positioned between carbide bit 48 and a silver solder billet 49 and bearing shoulder 47.

Extending between the side wall 52 of mounting block 36 and retaining opening 39 is an elongated bore or slide way 53 shown in dotted lines. Slide way 53 is aligned so its axis intersects some suitable intermediate portion of the main body of metal carrier 43 when it is situated within retaining opening 39. Prior to the actual soldering operation the metal carrier 33 is properly aligned and thereafter clamped by a clamping means 54 which has a side block 55 mounted securely to mounting block 36. Side block 55 has a tunnel 56 for retaining a pivotally mounted rocker bar 57 having a fixed end 58 secured to or otherwise operatively engaged by a conventional solenoid 59 with electrical wires 60. The opposite or free end 61 of rocker bar 57 carries an outer plunger portion 62 that is connected to an inner plunger portion 63 located within slideway 53 and which terminates in an engaging tip 64. The outer and inner plunger portions may be separable and connected by a spring loaded coupling in order to ease impact of engaging tip 64 against metal carrier 43.

When solenoid 59 is energized the movement of its armature, as indicated by directional arrow A, forces rocker bar 57 to move, as indicated by directional arrow B, in such a manner that the plunger, constituted by outer plunger part 62 and inner plunger parts 63, is urged from a retracted position to an extended position with engaging tip 64 exerting pressure against metal carrier 43 sufficient to hold it clamped in place.

Referring primarily to FIG. 1 and FIG. 2 when metal carrier 43 is held clamped in the retaining opening then the carbide bit 48 can be accurately aligned prior to the soldering operation with the aid of a pair of swing arms. A lower arm 66 is pivoted to mounting block 36 and an upper arm 67 is also pivoted to mounting block 36 at a point above the pivot axis of lower arm 66. Lower arm 66 and upper arm 67 are formed on their mutually inner walls with a pair of engagement pins 66a and 67a respectively. The outer or free ends of lower and upper arm 66 and 67 carry orienting jaws 68 and 69 specially shaped with notches 70 and 71 whose configurations are of complementary shape relative to opposing sides of the carbide bit 48. When the arms are swung upwardly from their retracted positions they move towards one another and the retaining opening until there specially shaped notches 70 and 71 engage their corresponding opposing sections of the carbide bit 48. As notches 70 and 71 engage carbide bit 48 the engagement pins 66a and 67a simultaneously contact opposing sides of a stop pin 79 projecting outwardly from mounting block 36. The carbide bit 48 becomes shifted and displaced until it is urged to a predetermined set position on the bearing shoulder of the metal carrier 43.

A cord 73 is attached to the outer wall of lower arms 66 and its other end is connected to a weighted mass 74. Similarly a cord 75 is attached to the outer wall of upper arms 67 and its other end is secured to a weighted mass 76. Mounted to the lower surface of shelf 13 and immediately beneath lower arm 66 is a safety switch 77 wired to the main electrical power supply circuit for the soldering apparatus 10 in such a way that unless arm 66 is retracted and forced to urge a slidable contact 78 downwardly then the main circuit cannot supply electricity for the soldering operation. Otherwise the operator might inadvertently attempt to commence the soldering operation with the adverse result that the metal jaws 68 and 69 would become fused with the metal carrier 43. The weighted masses 74 and 76 automatically restore the swing arms to their retracted positions when they are no longer manually held by the operator. The inner wall of lower arm 66 is formed with a recess 72 shaped to receive the base of upper swing arm 67 as shown by the dot dash line of FIG. 4.

Lying across the carbide bit 48 is a horizontally disposed electrical conductor bar 80 that is securely held by a reciprocable shuttle 81. Shuttle 81 is coupled within a friction or gear drive 83 that can be manually or automatically operated to selectively extend and retract conductor 80. Shuttle 81 is arranged within drive 83 so it may be slightly oscillated or pitched within a vertical plane in order to bear against and transmit force to carbide bit 48. Preferably the electrical conductor 80 is fabricated from substantially pure carbon and elongated segments of its opposing sides are flat surfaces. Either flat surface can therefore be oriented to make flush engagement with carbide bit 48.

Drive unit 83 is conveniently mounted on an air feeder unit 82 secured to shelf 13. Air feeder unit 82 has a cylindrical nozzle terminating in a discharge port 82a which can be regulated to direct a stream of coolant air to a desired point. A cooling means 84 in the form of a blower is structured to communicate air to feeder unit 82 at a predetermined time to cool the joint at an optimum rate. Preferably the discharge port 82a is oriented to issue coolant air to the base of metal carrier 43 enabling the cooling effect to progress upwardly to the joint. Electrical wires 85 connect cooling means 84 to the main electrical power supply unit and to a switch and suitable timing device for operating the cooling means 84 sequentially and automatically. For example, the cooling may commence automatically when electrical current being transmitted to the joint is discontinued but prior to the time when the joint is completed.

Situated above the swing arms 66 and 67 is a pair of electrodes 86 and 87 which converge downwardly and terminate in slightly spaced electrode tips 88 and 89 that can be brought to bear against electrical conductor 80 as shown in FIG. 4. The electrodes 86 and 87 are firmly held by a holding means that includes a pair of generally parallel elongated holding beams 90 and 91 separated by an intermediate slot 92. The outer or free ends of holding beams 90 and 91 have tightening grooves 93 and 94 which, when the electrodes are inserted in position can be tightened by nuts 95. The rearward ends of holding beams 90 and 91 are pivotally coupled to an erect mounting stand 96 and are wired by conductors 97 to an electrical power supply circuit 100. Between the ends of the holding beams are positioned height adjustable cam followers 98 and 99 whose depending ends engage barrel cam 33.

An electrical power supply circuit 100 includes a transformer unit 101, a power output regulator dial 102, a voltage and power readout gauge 103 and a master switch 104.

Referring primarily to FIG. 1 and FIG. 2 a force applying means 105 for causing electrodes 86 and 87 to be urged against electrical conductor 80 with the correct amount of pressure, includes a cross bar 106 spanning slot 92 and resting on holding beams 90 and 91.

An adjustable weight 107 is suspended from cross bar 106 by an intermediate cable 108. Depending upon a number of factors the optimum soldering conditions may require that weight 107 be varied from one given weight to a different given weight in order to regulate pressure exerted on the carbide bit before and during soldering and cooling operations. The weight 107 is selected in order to achieve a desired force upon electrical conductor 80. By way of example, in order to achieve an optimum silver solder thickness of 0.0005 inches in the completed joint the weight 107 may be nine pounds in order to cause the electrodes to bear against electrical conductor 80 with a combined force of 3 ⅓ pounds. If the combined force were greater then too much silver solder would be squeezed out during the soldering operation and conversely if the combined weight were less then the layer of silver solder would be too thick and consequently the joint would be correspondingly weakened.

A support 110 pivotally mounts barrel cam 33 by an eccentrically located pivot pin 111. Cable 30 is physically fixed or tightly bound on barrel cam 33 so that relative slippage is eliminated. When foot treadle 16 is depressed barrel cam 33 moves clockwise causing cam follower 99 to drop and the electrodes to likewise drop into engagement against electrical conductor 80. When foot treadle 16 is released and caused to be restored upwardly by the spring action of spring 34, barrel cam 33 will move counterclockwise in order to lift the electrodes away from electrical conductor 80.

A microswitch 115 having an electrical wire 116 is positioned near lower stop 24 and another microswitch 117 having a wire 118 is positioned near stop 23. Microswitch 117 is actually a double microswitch which operates to simultaneously turn off the transformer unit 101 and turn on cooling means 84. The safety switch 77 associated with swing arm 66 is connected to the electrical power supply circuit 100 by wire 119.

By way of example, the electrical power supplied by circuit 100 through the metal holding beams to the electrodes is approximately 100 amps and 12 volts; the electrodes are constructed from pure tungsten and are one-eighth inch in diameter; the electrical conductor 80 is fabricated from pure carbon and is one-eighth inch by three-sixteenths inches in cross section; the carbide bit 48 is 0.070 inches thick; the silver solder billet 49 is a conventional alloy consisting of approximately 60 percent silver, 39 percent copper, 1 percent of other various metals and the billet original size is ¼ inch by 9/64 inches by 0.020 inches thick; the layers of flux 50 and 51 are 0.010 inches thick; the soldering action dwell or duration time is between 3.5 seconds and 4 seconds; the cooling time is between 8 seconds and 10 seconds; and, the metal from which heat treated metal carrier 43 is fabricated is 1040 steel or its equivalent or 420 stainless steel or its equivalent.

OPERATION

Keeping the above construction in mind it can be understood how the previously described disadvantages of conventional techniques for joining carbide bits to metal carriers are overcome or substantially eliminated by the present invention.

In order to best illustrate and emphasize the important features of this invention it will be described for purposes of example in the context of assembling or making cutting teeth for incorporation in power chain saws circular saws or any other type of automatically or manually operated saw, wherein a carbide bit is joined to a heat treated metal carrier.

A number of carbide bits 48 are generally preassembled on associated metal carriers 43 and disposed in a tray for successive placement in the soldering apparatus 10. Referring to FIG. 3 a layer of fluxing compound 51 is spread over metal carrier bearing shoulder 47, the silver solder billet 49 is arranged approximately in place, a second layer of fluxing compound is deposited on billet 49 and then carbide bit 48 is laid loosely and approximately in place. With the pre-soldered components thus arranged as a stack, the metal carrier 43 is slipped into the retaining opening 39 with a linkage retaining aperture 44 looped over hanging peg 41. Metal carrier 43 is inclined against the adjacent wall of mounting block 36 for stability purposes and also to maintain the upper surface of carbide bit 48 generally horizontal and facing upwardly towards the electrodes 86 and 87.

The swing arms 66 and 67 are manually moved towards one another from their retracted positions until the orienting jaws 68 and 69 engage opposing sides of the carbide bit 48 as engagement pins 66a and 67a engage stop 79. After the carbide bit 48 has been precisely oriented relative to metal carrier 43 the pressure on arm 66 and 67 is relaxed and they are permitted to swing outwardly and downwardly to their retracted positions at which time safety switch 77 becomes closed.

Drive unit 83 is manually or automatically operated to urge shuttle 81 from a retracted position so that electrical conductor 80 is moved a sufficient distance to lay immediately over and spaced by a small gap from carbide bit 48.

The clamping means 54 is operated either by an independent electrical circuit or by the electrical power supply circuit 100 which would function to energize solenoid 59 when foot treadle 16 is depressed by a predetermined amount. As foot treadle 16 is depressed farther the eccentrically mounted barrel cam 33 pivots downwardly to eventually permit the force applying means 105 to urge holding beams 90 and 91 downwardly. Eventually electrodes 86 and 87 contact underlying electrical conductor 80 which is thrust with the proper and predetermined amount of force against carbide bit 48. The adjustable weight 107 is selected so that the ideal force is applied to the stack of materials prior to and during the soldering operation. As previously indicated the optimum silver solder thickness of 0.0005 inches is achieved by selecting a weight 107 that will cause the electrodes 86 and 87 to exert a combined force of 3 ½ pounds on electrical conductor 80.

When the switch operating rod 22 is moved sufficiently downwardly to close microswitch 115, the electrical power supply circuit 100 is energized to transmit current to electrical wires 97 and holding beams 90 and 91 to the electrodes 86 and 87. The optimum voltage and current are supplied for a predetermined time after which the power is terminated either manually or automatically. Current flows by way of example through electrode 86 into electrical conductor 80 and in a reverse path upwardly and outwardly through electrode 87.

Electrical conductor 80 serves as a bridge and also as a heating unit. The heat generated as a result of the resistance offered by electrical conductor 80 to the passage of current will naturally penetrate downwardly into the carbide bit 48. As the heat content resulting from conduction and radiation intensifies and migrates downwardly through the silver solder billet 49 and the fluxing compound, these materials begin to melt and eventually the carbide bit becomes soldered to the metal carrier 43. The controlled amount of force applied to the joint and simultaneous controlled amount of heat directed to the joint coupled with a relatively short time span during which soldering action occurs all contribute to prevent heat from penetrating deeply into and throughout the metal carrier 43. Therefore the metal carrier 43 does not become embrittled and/or annealed and prone to breakage. Furthermore, as the silver solder billet 49 melts to a layer thickness of 0.0005 inches the excess volume becomes distributed as a fillet between the carbide bit and metal carrier in such a way to contribute additional strength and stability to the joint.

After current has been applied to the joint for approximately 3.5 seconds it is discontinued and a switch is then automatically closed in response to a timing device so a stream of coolant air is caused to issue from discharge port 82a in order to cool the metal carrier 43 and weldment juncture at the proper rate in order to attain a perfect joint.

Although for purposes of illustration and convenience this invention has been described by referring specifically to soldering carbide bits to metal carriers it should be understood that this invention may be practiced to join various hard metals to dissimilar metals.

From the foregoing it will be evident that the invention has specifically provided a soldering apparatus for saw cutting teeth in which all of the various advantages are fully realized.

What is claimed is:

1. A soldering machine for joining together a metal carrier and a carbide bit without flowing electricity through the metal carrier and caribde bit, comprising:
   a. a mounting block with a retaining opening shaped to receive and retain a metal carrier;
   b. holding means carrying a pair of electrodes capable of being moved between extreme positions;
   c. an electrical conductor movable between an extended position in electrical contact with the electrodes when the electrodes are in one of their extreme positions, and, a retracted position away from and out of electrical contact with the electrodes;
   d. force applying means operable to cause contact and mutual pressure between the electrical conductor and a carbide bit;
   e. an electrical power supply circuit electrically coupled to the electrodes for transmitting electrical power to the electrodes; and,
   f. actuating means for selectively energizing the electrical power supply circuit in order to solder a carbide bit to an associated metal carrier, the actuating means being operable to cause the electrical power circuit to flow current in a path from one electrode through the electrical conductor for generating heat by electrical resistance and back through the other electrode,
   wherein, the soldering machine is arranged so that current is not passed through the metal carrier or carbide bit at any time during the soldering operation.

2. The structure according to claim 1, including:

orienting means for orienting a carbide bit on a metal carrier, the orienting means having a pair of arms with orienting jaws arranged to move from retracted positions towards one another and the retaining opening so the jaws can engage opposing sections of a carbide bit and set it at a predetermined position on the carrier.

3. The structure according to claim 2, wherein;
the arms are pivotally coupled to the mounting block and have free ends that mount the orienting jaws.

4. The structure according to claim 3, wherein;
the orienting jaws have notches of complementary shape relative to their corresponding opposing sections of the carbide bit.

5. The structure according to claim 3, including:
a safety switch adjacent one arm arranged to maintain the electrical power circuit open unless the arm is restored to its retracted position.

6. The structure according to claim 1, including:
a drive unit incorporating a shuttle secured to the electrical conductor for shifting the electrical conductor between its retracted and extended positions.

7. The structure according to claim 6, wherein:
the drive unit is located laterally of the electrodes and the shuttle is mounted and arranged to cause the electrical conductor to travel horizontally and slightly downwardly into engagement with a carbide bit.

8. The structure according to claim 6, wherein;
the electrical conductor is fabricated from substantially pure carbon and has an elongated flat surface, the conductor being secured to the shuttle in a manner so that when extended its flat surface faces downwardly and makes flush engagement with the carbide bit.

9. The structure according to claim 1, wherein;
the holding means is movable; and,
a stand pivotally mounts the holding means so it can be swung towards and from the mounting block.

10. The structure according to claim 9, wherein;
the holding means is constituted by a pair of spaced holding beams that define an intermediate slot and are pivotally coupled to the stand, the holding beams having free ends tightly holding the electrodes.

11. The structure according to claim 10, wherein;
the electrodes converge in a direction towards the retaining opening and spaced by a slight gap.

12. The structure according to claim 10, wherein;
the force applying means is coupled to the holding beams to transmit force to the electrodes which are caused to bear upon the carbide bit before and during the soldering operation.

13. The structure according to claim 12, wherein the force applying means includes:
a cross bar spanning across the slot and resting on the tops of the holding beams;
an adjustable weight; and,
a cable connecting the weight and cross bar to suspend the weight beneath the slot.

14. The structure according to claim 1, wherein;
a metal carrier has a linkage retaining aperture and is positioned in the retaining opening and
the mounting block includes a hanging peg within the retaining opening for projecting through the linkage retaining aperture to facilitate in holding the metal carrier.

15. The structure according to claim 1, including:
clamping means coupled to the mounting blocks for releasably clamping a metal carrier within the retaining opening.

16. The structure according to claim 15, wherein;
the mounting block has a slide way extending between the retaining opening and an external location and
the clamping means includes a plunger positioned partially within the slide way and movable between an extended limit in engagement with the metal carrier and a retracted limit disengaged from the metal carrier.

17. The structure according to claim 16, wherein the clamping means includes:
a solenoid; and,
a rocker bar operatively engaged with the solenoid at one end and coupled to the plunger at the other end so that when the solenoid is energized the rocker bar is caused to rock in one direction to extend the plunger against the metal carrier to clamp the metal carrier in place.

18. The structure according to claim 1, including:
cooling means for cooling the joint between the metal carrier and carbide bit as the force applying means causes the electrodes to bear against the carbide bit.

19. The structure according to claim 1, wherein the actuating means includes:
a foot treadle and
a switch operating rod coupled to the foot treadle for selectively closing and opening a switch of the electrical power supply circuit.

20. The structure according to claim 18, wherein;
the actuating means is operatively connected to the force applying means so the foot treadle can be manipulated to selectively operate and release the force applying means.

21. A soldering machine for joining together a metal carrier and a carbide bit for use as a saw cutting tooth, comprising:
a. a heat treated metal carrier, a silver solder billet and a carbide bit held together as a stack by fluxing compound;
b. a mounting block with a retaining opening shaped to receive and retain a metal carrier;
c. orienting means for orienting the carbide bit on the metal carrier;
d. clamping means coupled to the mounting block for releasably clamping the metal carrier in the retaining opening;
e. holding means carrying a pair of electrodes constructed of hard material and capable of being moved between extreme positions;
f. an electrical conductor movable between an extended position in electrical contact with the electrodes when the electrodes are in one of their extreme positions, and, a retracted position away from and out of electrical contact with the electrodes;
g. force applying means operable to cause contact and mutual pressure between the electrical conductor and a carbide bit;

h. an electrical power supply circuit electrically coupled to the electrodes for transmitting electrical power to the electrodes; and,
i. actuating means for selectively energizing the electrical power supply circuit in order to solder a carbide bit to an associated metal carrier, the actuating means being operable to cause the electrical power circuit to flow current in a path from one electrode through the electrical conductor for generating heat by electrical resistance and back through the other electrode, wherein, the soldering machine is arranged so that current is not passed through the metal carrier or carbide bit at any time during the soldering operation and the final thickness of the silver solder layer is approximately 0.0005 inches.

* * * * *